Nov. 29, 1938.   H. GLASSER ET AL   2,138,420
ELECTRICAL OVERHEAD CABLE
Filed Oct. 18, 1934
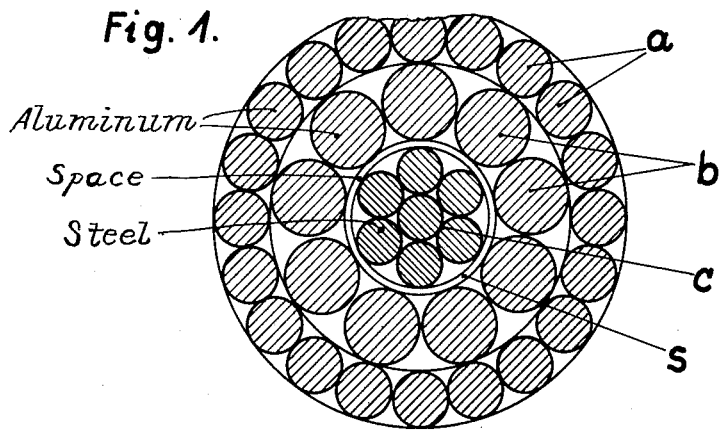
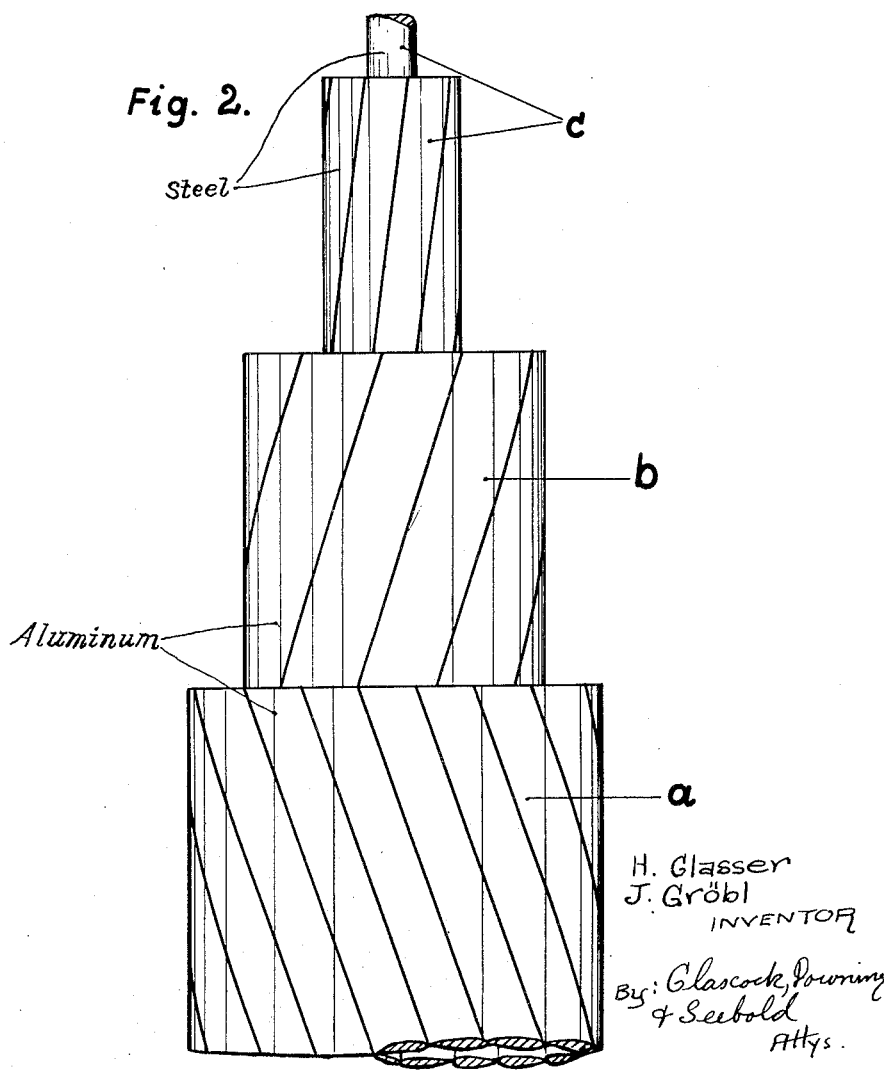
H. Glasser
J. Gröbl
INVENTOR
By: Glascock, Downing
& Seebold
Attys.

Patented Nov. 29, 1938

2,138,420

UNITED STATES PATENT OFFICE 2,138,420

ELECTRICAL OVERHEAD CABLE

Heinrich Glasser, Munich, and Josef Gröbl, Solln, near Munich, Germany, assignors to Bayernwerk A.-G., Munich, Germany Application October 18, 1934, Serial No. 748,932
In Germany October 24, 1933

3 Claims. (Cl. 173—13)

Electrical overhead cables are often set into oscillation by existing air currents, the oscillations being visible as stationary waves of small amplitudes. This phenomenon is most noticeable on cold winter days, since at that time the air currents are most uniform and the tension on the cable is greatest owing to the low temperature.

The detrimental consequences of these oscillations have been found out only in the last few years. Some of the cable wires break in the proximity of the points of suspension, owing to the continual small bendings of the cable. This condition spreads quickly to the other wires of the cable until the cross-section, serving as a mechanical support and for the electrical conduction, is so reduced that in consequence of the mechanical excess stresses and heating by the electrical current, the cable finally breaks.

Various proposals have hitherto been made as regards these cable oscillations and their consequences, such as, for instance: relieving the parts of the cable especially endangered by the oscillations, by means of damping bars, by the addition of springs or other cables; or reducing the amplitudes of the oscillations by means of oscillating devices provided on the cable, or by devices acting in the manner of friction brakes.

The object in view is not fully attained by using these known additional apparatus, since the damping means have a partial damping effect only after the occurrence of strong oscillations or only within a definite range of the occurring frequencies of the cable, or they are quickly destroyed by the high frequency.

The object of the present invention is to provide a cable which shall be of such a construction that cable oscillations of any frequency will be damped to a minimum, and which will destroy the oscillatory energy of a field under tension at so many points by impacts that damaging will be completely avoided.

This object is attained by arranging that in a cable having a number of cable layers when installed, the speeds of the wave propagation in the outer part of the cable, hereinafter referred to as the "covering cable", and in the part of the cable lying inside, hereinafter referred to as the "core cable", shall be different from each other and that the two said parts of the cable shall not be rigidly coupled together. The improved cable consists, so to say, of two concentric cables wherein a suitable intermediate space, for instance, an air-gap, is provided between the core cable and the covering cable, which space is almost independent from the tension. In this way the covering cable is capable of moving relatively to the core cable, which relative movement is limited by the said intermediate space. In addition thereto, the speeds of the wave propagation of the core cable and covering cable must be different from one another.

The speed of wave propagation $c$ is given by the formula:

$$c = \sqrt{\frac{\sigma \cdot g}{\gamma}}$$

wherein $\sigma$ is the tension of the cable, $g$ is the acceleration due to gravity, and $\gamma$ the specific gravity of the conductor.

Thus:

$$\frac{c_1}{c_2} = \frac{\sqrt{\frac{\sigma_1}{\gamma_1}}}{\sqrt{\frac{\sigma_2}{\gamma_2}}}$$

which has to be different from 1. The more this value differs from 1 the better is the damping of the oscillation, as can be proved by the following mathematical considerations:

Eddies produced by the wind impart to the covering cable a definite frequency $v_1$, and the said cable is set into small oscillations, the half wave lengths $\lambda_1$ of which is given by the equation:

$$\lambda_1 = \frac{c_1}{2v_1}$$

If the amplitudes of the covering cable become greater than the existing air-gap, its apices touch the core cable and set the latter into oscillation with the same half wave length $\lambda_2 = \lambda_1$. However, owing to the different speed of propagation $c_2$, the frequency of the core cable becomes $$v_2 = \frac{c_2}{c_1} \cdot v_1$$

and the two cables do not oscillate with the same speed, but have different speeds when they come again against each other. This causes energy to be destroyed each time the two cables abut against each other and this destruction of energy is proportionate to the square of the difference between the speeds of the two cables. But, as the speed difference is the greater the greater the frequency difference and the greater the existing amplitude, the destroyed energy will become, after a certain period of time, equal to the energy of the wind and the covering cable will not be able to take up a greater amplitude.

As can be proved, this condition is soon attained and also when, in a position of rest, the middle points of the core cable and covering cable are at a distance from one another equal to the size of the airgap. In this way oscillatory energy is destroyed at each point of contact, that is to say, practically all along the whole length of the cable and the damaging of the cable is avoided. With the cable, according to the invention, a stripping-off, damaging or freezing in, of the damping device itself, as is the case with the additional apparatus hereinbefore referred to, is impossible.

The covering cable, which may be considered to be a hollow cable, may be constructed as a "hollow cable without supports" from profile wires or as a "hose" from ordinary wires of circular cross-section. By using a suitable cable diameter, wire diameter, number of wires and laying length, a self-supporting tubular structure of circular wires is obtained which can be manufactured the easier the shorter the laying length and the smaller the required number of wires. The cable layer of the covering cable surrounding the core cable is, therefore, preferably made of wires of larger diameter than the subsequent cable layer of the covering cable. For reasons of mechanical strength, a too small laying length is to be avoided so that laying length numbers between 5 and 8 are the most suitable ones. By "laying length number" we understand the number by which the outer diameter of a cable layer is to be multiplied in order to obtain the length of a complete single wire winding with respect to the axis of the cable.

The different speeds of wave propagation of the covering cable and core cable can be attained by using, for instance, suitable material in which $$\frac{E_1 \cdot \gamma_2}{E_2 \cdot \gamma_1}$$

is as much as possible different from 1, (E is the modulus of elasticity) for instance, by using steel and copper or steel and aluminium.

The present invention is of special importance for electrical overhead cables which, in addition to having a high electrical conductivity, must have great mechanical strength, since the danger of breaking under the action of the oscillations greatly increases with tensional stresses. By using a core cable of steel, bronze cables may be replaced in the construction hereinbefore described by steel-copper cables without increasing the cost of manufacture, whilst perfect reliability against damage due to oscillations is thereby obtained. The use of the invention hereinbefore described is especially useful also in the case of steel-aluminium cables, since the same materials are employed as in the previous constructions.

The factor $$\frac{c_1}{c_2} = \sqrt{\frac{E_1 \cdot \gamma_2}{E_2 \cdot \gamma_1}}$$

is further increased by the construction that the cable layers of the core cable are produced with a greater laying length number ($\Sigma = 11-14$) than the cable layers of the covering cable ($\Sigma = 5-8$) so that these show a greater extensibility than the steel cable and, consequently, are under a comparatively smaller tension than the steel cable.

The accompanying drawing illustrates in cross-section and elevation a multi-layer cable in which, for the purpose of the automatic damping of the cable oscillations, according to the invention hereinbefore described, when the cable is installed, the speeds of the wave propagation in the covering cable and in the core cable are made different from each other and the said two cables are not rigidly coupled together.

The cross-section illustrated in Figure 1 of the cable consisting of two concentric individual parts, shows that the covering cable, consisting of the stranded wires $a$ and $b$, is separated from the core cable consisting of the wires $c$ by an intermediate space $s$ (for instance, an air-gap). The difference in the speeds of the wave propagation of the covering cable and core cable is attained by that the covering cable, consisting of the wires $a$ and $b$, is formed of a material which is different from that of the core cable formed by the wires $c$, the specific gravity $\gamma_1$, $\gamma_2$ and the modulus of elasticity $E_1$ and $E_2$ being so chosen that the value $$\frac{E_1 \cdot \gamma_2}{E_2 \cdot \gamma_1}$$

differs as much as possible from 1. This condition is fulfilled if the wires $c$ of the core cable are, for instance, made of steel and the wires $a$ and $b$ of the cover cable of copper or aluminium.

Figure 2 is an elevation of the cable illustrated in cross-section in Figure 1. The wires $a$ and $b$ of the covering cable which, by way of example, is shown to consist of two layers, and which surrounds the core cable $c$, are, in view of the fact that use is made of wires of circular cross-section, preferably stranded together in opposite directions and with short laying lengths.

What we claim is:

1. An overhead cable comprising, a core cable and a covering cable, the covering cable being self-supporting and surrounding the core cable substantially concentrically leaving a space interval between the covering cable and the core cable which is small as compared with the diameter of the core cable, said space interval being so dimensioned as to allow the mechanical oscillations of the core cable and the covering cable mutually to damp one another by impact losses along the whole cable when the cable is in an installed and tensioned position.

2. An overhead cable as claimed in claim 1 wherein the covering cable consists of a number of layers in which the layer of the covering cable surrounding the core cable consists of circular wires of one diameter and the next following layer consists of wires of a smaller diameter.

3. An overhead cable as claimed in claim 1 in which the covering cable surrounding the core cable and the core cable consists of circular wires, the circular wires of the covering cable being arranged with a smaller laying length number than the wires of the core cable.

HEINRICH GLASSER.
JOSEF GRÖBL.